Oct. 26, 1965 C. P. BROOKS 3,214,199
PIPE COUPLING
Original Filed July 6, 1959

INVENTOR.
Charles P. Brooks
BY
Hovey, Schmidt, Johnson & Hovey
ATTORNEYS.

United States Patent Office 3,214,199
Patented Oct. 26, 1965

3,214,199
PIPE COUPLING
Charles P. Brooks, Kansas City, Mo.
(320 Henry Ave., Manchester, Mo.)
Continuation of application Ser. No. 825,193, July 6, 1959. This application Oct. 24, 1962, Ser. No. 233,500
2 Claims. (Cl. 285—189)

This application is a continuation of application Serial No. 825,193 filed July 6, 1959, now abandoned.

This invention relates broadly to the plumbing field, and more particularly to underground piping, especially sewer mains and laterals therefrom, the primary object being to alleviate the somewhat difficult, expensive and unsatisfactory procedure presently used in favor of a system that will permit the connecting of a lateral to a sewer main quickly, easily, inexpensively, and without fear of subsequent breakdown.

Today, when a lateral conduit is to be placed into communication with a previously laid and covered sewer main so as to connect a house or other building therewith, it is necessary, after making an excavation, to cut the main, insert a T, and thereupon join the lateral to the T. This procedure is most difficult, time-consuming, expensive, and most unsatisfactory from the standpoint of leakage and/or breakage after the job has been completed and the joint again covered with dirt.

It is the most important object of the present invention, therefore, to provide a novel coupling that may be easily attached to the sewer main after cutting a hole in the latter, and thereupon joined with the latter without undue difficulty.

Another important object of the present invention is to provide a coupling that presents an exceptionally strong joint and, therefore, one that is not likely to become displaced or damaged to an extent requiring repair, even after long continued use and notwithstanding conditions of earth movement which have heretofore presented troublesome problems.

Figure 1:
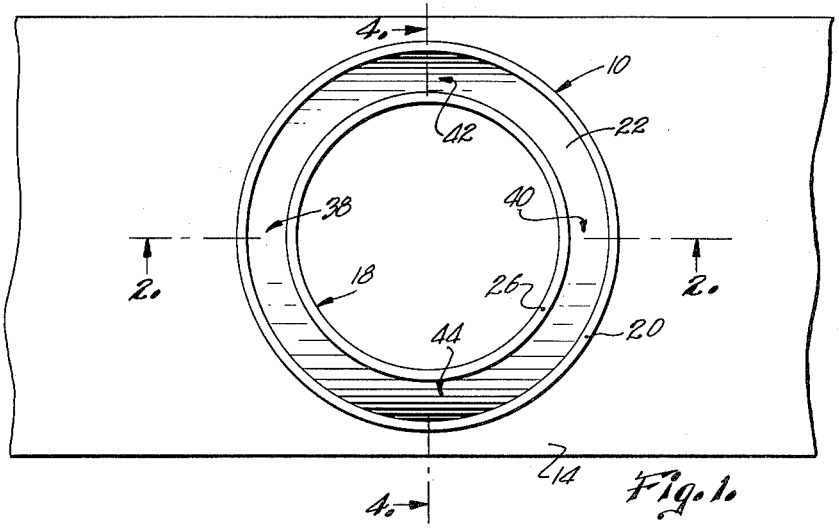
FIG. 1 is a view showing a sewer pipe fragmentarily, together with a pipe coupling made pursuant to my present invention operably associated with the sewer pipe.

Prior to placing coupling 10 in use, it is necessary to drill or otherwise form a hole 12 in sewer pipe 14 after the dirt has been removed to expose the pipe 14 if the latter has been covered prior to placing of a lateral conduit 16 into communication with the pipe 14 through use of my novel coupling 10.

The manner of making the hole 12 in the pipe 14 forms no part of the instant invention, but it is contemplated that the hole 12 be produced through use of a cylindrical cutter having a diameter that is substantially the same as the outer diameter of an inner tube 18 forming a part of coupling 10 which is in the nature of a unitary body. Additionally, the coupling 10 includes an outer tube 20 that surrounds the tube 18 and is integrally joined thereto through use of a wall 22 that completely surrounds the tube 18, and which is in turn surrounded by the tube 20.

Figure 4:
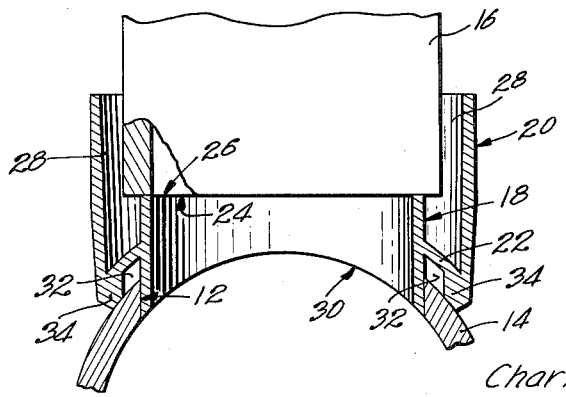
FIG. 4 is a fragmentary, cross-sectional view taken on line 4—4 of FIG. 1.

It is to be noted at this juncture, that for purposes of illustration, the pipe 14, the lateral conduit 16, the tube 18, and the tube 20 are all shown cylindrical. Conduit 16 may actually be one section of a pipe that has a bell or hub end (not shown) and a spigot end, the latter of which extends into the tube 20 in the manner illustrated in FIG. 4 in registering relationship with the tube 18. To this end, the inner end 24 of the conduit 16 abuts the outer end 26 of the tube 18 and also, as seen in FIG. 4, the inside diameter of the conduit 16 is preferably the same as the inside diameter of the tube 18.

Wall 22 is of such width as to present a space 28 between tubes 18 and 20, as well as between the outer face of conduit 16 and the inner face of tube 20. Such space 28 is adapted to receive a suitable material (not shown) capable of sealing the joint presented by interengaging ends 24 and 26 and to hold the lateral conduit 16 in place with respect to coupling 10 so as to maintain tube 18 and conduit 16 axially aligned as shown in FIG. 4.

It is important to note that the tube 18 is provided with an undulated innermost edge 30 so that when the tube 18 is extended into the hole 12, such edge 30 is flush with the inner face of the pipe 14. This eliminates collection of debris within the pipe 14 at the edge 30 of tube 18.

In order to assure the maintenance of edge 30 flush with the inner face of pipe 14, and in order to present a space 32 between wall 22 and the outer face of pipe 14, coupling 10 is provided with a plurality of lugs 34 that bear against the outer face of the pipe 14 and are preferably integral with the wall 22 and, therefore, the inner edge 36 of the tube 20.

A space 32 is adapted also to receive a suitable material 37 (shown only in FIG. 3), adapted to seal the joint presented between hole 12 and the outer face of tube 18. Accordingly, since wall 22 is integral with the tube 18 intermediate the ends of the latter, and extends outwardly therefrom, joining with the outer tube 20 at the inner edge of the latter, wall 22 serves to separate the sealing material within space 28 from the sealing material within space 32.

Figure 2:
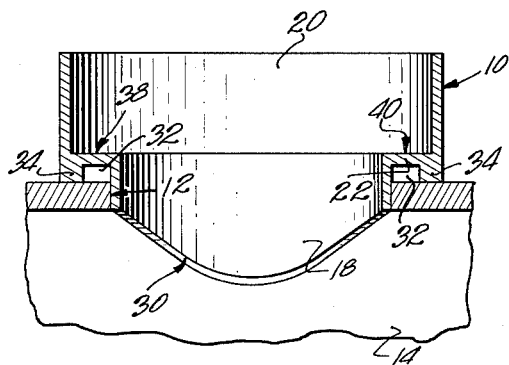
FIG. 2 is a fragmentary, cross-sectional view taken on line 2—2 of FIG. 1.
Figure 3:
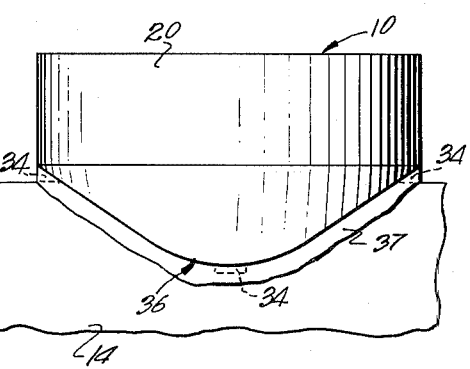
FIG. 3 is a fragmentary, elevational view of the structure shown in FIG. 1.

It is noted additionally, particularly in FIG. 3, that the aforementioned inner edge 36 of tube 20, proximal to pipe 14, is undulated so that the space 32 is of uniform volume throughout the circumference of the tube 20 at edge 36. To this end also, the wall 22 is uniformly spaced from the pipe 14 and, as shown in FIGS. 1 and 2, the outer face of wall 20 merges with the end 26 of tube 18 at two diametrically opposed zones 38 and 40. However, at diametrically opposed zones 42 and 44, the outer face of wall 22 is spaced appreciably from the end 26 of tube 18 as best seen in FIGS. 1 and 4.

It is now clear that the location of hole 12 in pipe 14 is of no consequence and the point where the same is to be formed in pipe 14 will be governed by the location of the lateral 16 and its intended angle of approach to the pipe 14, as well as the angularity of the latter insofar as the horizontal is concerned.

Having thus described the invention what is claimed as new and desired to be secured by Letters Patent is:

1. A coupling for connecting a lateral conduit to the side of a main, said main having a hole formed in the wall thereof, said coupling comprising:

(1) an inner tube having an axial passage therethrough and having an axially inwardly extending inner end portion, said inner end portion extending to at least the outer surface of said main which defines said hole, the radius of said hole and one of the peripheral surfaces of said inner end portion being substantially the same, (2) an outer tube of larger interior diameter than the exterior diameter of said inner tube, said outer tube surrounding and being radially spaced from said inner tube, the axially outer end of said outer tube being adapted to sealingly receive said lateral conduit, (3) wall means surrounding said inner tube and interconnecting said inner end portion of said inner tube with the radially adjacent portion of said outer tube, said wall means connecting with the inner end portion at a point spaced axially outwardly from the outside surface of said main, (4) at least four peripherally disposed, substantially equally spaced lug means extending axially inwardly from the axially inner surface of said wall means for engaging the outside surface of said main, the axialy inner ends of said lug means having a relatively small area compared to that of said wall means and defining in part a surface which is parallel to the outside surface of said main, said axially inner ends of said lug means being the only surfaces of said coupling in contact with the outside surface of said main, (5) said wall means, said inner end portion, and the outside surface of said main defining an annular space, sealing material in said space, the volume of said sealing material being greater than the volume of said annular space, (6) said lug means defining openings which communicate with said space to permit the escape of excess sealing material and thereby provide a visible indication of the made-up joint.

2. A coupling as set forth in claim 1 wherein said wall means and said axially inner end of said outer tube are undulated to generally parallel the outside surface of said main so as to provide said space with a substantially uniform thickness.

References Cited by the Examiner

UNITED STATES PATENTS

| | | | |
|---|---|---|---|
| 875,729 | 1/08 | O'Brien | 285—197 |
| 963,498 | 7/10 | Bard | 285—197 |
| 1,278,128 | 9/18 | Flower | 285—197 |
| 1,883,439 | 10/32 | Adams | 285—284 |
| 2,660,200 | 11/53 | Corey | 285—197 |
| 2,680,631 | 6/54 | Smith | 285—419 |
| 2,686,066 | 8/54 | Paquin. | |
| 2,812,959 | 11/57 | Fuller. | |
| 2,992,017 | 7/61 | Dritz | 285—22 |

FOREIGN PATENTS

| | | |
|---|---|---|
| 793,236 | 11/35 | France. |
| 14,926 | 8/93 | Great Britain. |
| 274,729 | 7/27 | Great Britain. |

CARL W. TOMLIN, *Primary Examiner.*